US012770850B2

(12) United States Patent
Maeda

(10) Patent No.: US 12,770,850 B2
(45) Date of Patent: Oct. 20, 2026

(54) METHOD FOR MASS SPECTROMETRY AND MASS SPECTROMETER

(71) Applicant: SHIMADZU CORPORATION, Kyoto (JP)

(72) Inventor: Kazuma Maeda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 503 days.

(21) Appl. No.: 18/160,016

(22) Filed: Jan. 26, 2023

(65) Prior Publication Data

US 2023/0245875 A1 Aug. 3, 2023

(30) Foreign Application Priority Data

Feb. 3, 2022 (JP) ................................ 2022-015466

(51) Int. Cl.
*H01J 49/00* (2006.01)
*H01J 49/24* (2006.01)
*H01J 49/40* (2006.01)
*H01J 49/42* (2006.01)

(52) U.S. Cl.
CPC ........ *H01J 49/005* (2013.01); *H01J 49/0031* (2013.01); *H01J 49/0036* (2013.01); *H01J 49/24* (2013.01); *H01J 49/401* (2013.01); *H01J 49/4215* (2013.01)

(58) Field of Classification Search
CPC ...... H01J 49/004; H01J 49/0045; H01J 49/40; H01J 49/0027; H01J 49/0036; H01J 49/005; H01J 49/24; H01J 49/4215; H01J 49/0063; H01J 49/0031
See application file for complete search history.

(56) References Cited

U.S. PATENT DOCUMENTS 5,073,713 A * 12/1991 Smith ...................... H01J 49/32 250/282
6,124,591 A * 9/2000 Schwartz ............ H01J 49/0063 250/282
6,166,378 A * 12/2000 Thomson .............. H01J 49/004 250/281
9,111,736 B2 * 8/2015 Asano ...................... H01J 49/02
(Continued)

FOREIGN PATENT DOCUMENTS

WO 2019/229942 A1 12/2019

*Primary Examiner* — Wyatt A Stoffa
(74) *Attorney, Agent, or Firm* — Sughrue Mion, PLLC

(57) ABSTRACT

In a mass spectrometer provided with a measurement section (1) including a collision cell (17) and a mass separator (20-23) for a mass spectrometric analysis of product ions, a CES-method-condition determiner (321) determines collision-energy (CE) values for a collision energy spread (CES) method according to given conditions including the range and number of CE values, in such a manner that n+1 CE values to be used when the number is n+1 (where n is an integer equal to or greater than three) include n collision-energy values used when the number is n and one additional CE value different from the n CE values. An analysis controller (30) sequentially changes the collision energy to the n+1 CE values and controls the measurement section to execute an MS/MS analysis under each CE value. A data processor (33) obtains a cumulative mass spectrum by accumulating mass spectra respectively obtained under different CE values.

8 Claims, 3 Drawing Sheets

(56) References Cited

U.S. PATENT DOCUMENTS

| | | | | |
|---|---|---|---|---|
| 10,139,379 | B2 * | 11/2018 | Remes | G01N 30/7233 |
| 10,573,501 | B2 * | 2/2020 | Geromanos | H01J 49/0027 |
| 10,748,751 | B2 * | 8/2020 | Kitano | H01J 49/009 |
| 10,971,344 | B2 * | 4/2021 | Remes | H01J 49/0031 |
| 11,921,095 | B2 * | 3/2024 | Jones | G01N 30/8675 |
| 2002/0166959 | A1 * | 11/2002 | Bandura | H01J 49/105<br>250/282 |
| 2004/0041090 | A1 * | 3/2004 | Bloomfield | H01J 49/063<br>250/282 |
| 2005/0167582 | A1 * | 8/2005 | Zavitsanos | H01J 49/02<br>250/281 |
| 2005/0277789 | A1 * | 12/2005 | Bloomfield | H01J 49/063<br>564/4 |
| 2007/0096021 | A1 * | 5/2007 | LeBlanc | H01J 49/0045<br>250/282 |
| 2014/0001354 | A1 * | 1/2014 | Asano | H01J 49/005<br>250/288 |
| 2014/0197308 | A1 * | 7/2014 | Green | H01J 49/401<br>250/282 |
| 2015/0034815 | A1 * | 2/2015 | Bonner | H01J 49/004<br>250/282 |
| 2017/0370889 | A1 * | 12/2017 | Remes | G01N 30/8693 |
| 2018/0166265 | A1 * | 6/2018 | Geromanos | H01J 49/0027 |
| 2018/0218893 | A1 * | 8/2018 | Shiohama | H01J 49/4215 |
| 2019/0234916 | A1 * | 8/2019 | Yamamura | H01J 49/04 |
| 2020/0083031 | A1 * | 3/2020 | Remes | H01J 49/0031 |
| 2020/0211830 | A1 * | 7/2020 | Kitano | H01J 49/004 |
| 2021/0109069 | A1 * | 4/2021 | Jones | H01J 49/0031 |

* cited by examiner

METHOD FOR MASS SPECTROMETRY AND MASS SPECTROMETER

TECHNICAL FIELD

The present invention relates to a mass spectrometer capable of an MS/MS analysis as well as a method for mass spectrometry in the same mass spectrometer.

BACKGROUND ART

MS/MS analysis, which is one of the techniques for mass spectrometry, is useful for identifying compounds having high molecular weights as well as analyzing their chemical structures. As for the mass spectrometer capable of an MS/MS analysis, a triple quadrupole mass spectrometer and a quadrupole time-of-flight mass spectrometer (which is hereinafter called a "Q-TOF mass spectrometer") are commonly known. These types of mass spectrometers normally include a collision cell. Ions having a predetermined amount of energy (collision energy) are introduced into the collision cell and made to collide with a collision gas so as to induce collision induced dissociation (CID) and thereby dissociate the ions. A mass spectrometric analysis of the product ions resulting from the dissociation is performed to create a mass spectrum (product ion spectrum).

Since the bond energies of various binding sites in a compound vary from portion to portion, the ease of breaking the binding sites also varies from site to site. Therefore, in the previously described type of mass spectrometer, when the collision energy (which may be hereinafter abbreviated as "CE") which an ion has when introduced into the collision cell is changed, the form of dissociation changes even when the ion is derived from the same compound, so that the resulting product ion spectrum has a different peak pattern.

In general, for the identification or structural analysis of a compound having a complex chemical structure, it is advantageous to find out the masses of various fragments originating from that compound. Accordingly, in a conventionally known analytical technique called a "collision energy spread method" (which is hereinafter called the "CES method"), a product-ion scan measurement is repeated for one target compound while sequentially changing the CE value to a plurality of levels, and the thereby obtained mass spectra are accumulated to create a mass spectrum in which various kinds of product ions are observed (see Patent Literature 1 or other related documents). The mass spectrum thus created by the accumulation (which is hereinafter called the "cumulative mass spectrum") is a mass spectrum including a mixture of peaks originating from various product ions resulting from the dissociation under different CE values.

CITATION LIST

Patent Literature

Patent Literature 1: WO 2019/229942 A

SUMMARY OF INVENTION

Technical Problem

In the CES method, it is preferable to accumulate mass spectra obtained under various CE values. However, the number of CE values (the number of levels to which the CE value is changed; this number may be hereinafter called the "CE-value number") used in the CES method is constrained by analysis conditions, such as the number of times of the accumulation of mass spectra as well as the measurement time. In the conventional mass spectrometer, the CE values in the CES method are determined by dividing the range of CE values (from the lower to the upper limit; this range may be hereinafter called the "CE-value range") specified directly or indirectly as one of the analysis conditions, by the number of CE values determined from specific constraints, such as the number of times of the spectrum accumulation and the period of time allotted to the measurement by the CES method. For example, when the CE-value range is from 20 to 50 V and the CE-value number is 5, the CE values (V) in the CES method are set at five levels of 20, 27.5, 35, 42.5 and 50. When the CE-value number is 4 while the CE-value range is identical to the aforementioned one, the CE values (V) in the CES method are set at four levels of 20, 30, 40 and 50. Although CE values may be expressed in eV, it is often a common practice to represent a CE value by the voltage which gives the collision energy. Accordingly, the unit V is used throughout the present description.

Thus, even when the CE-value range is the same, the CE values significantly change with a change in the CE-value number, or analysis conditions, with the result that the pattern of the cumulative mass spectrum may significantly change. Cumulative mass spectra are useful for identifying compounds by pattern matching based on a database (or similar identification methods). However, if the pattern of the cumulative mass spectrum significantly changes with a change in the CE-value number, a problem may possibly occur in the aforementioned task of identifying compounds. Another problem is that it is difficult to compare cumulative mass spectra obtained under different conditions.

The present invention has been developed to solve the previously described problems. Its primary objective is to provide a method for mass spectrometry and a mass spectrometer which can avoid a significant change in the pattern of the cumulative mass spectrum with a change in CE-value number when obtaining cumulative mass spectra by the CES method.

Solution to Problem

One mode of the method for mass spectrometry according to the present invention developed for solving the previously described problem is a method for mass spectrometry using a mass spectrometer capable of an MS/MS analysis and provided with a measurement section which includes a collision cell configured to dissociate an ion and a mass separator configured to perform a mass spectrometric analysis of product ions resulting from dissociation, the method for mass spectrometry including the step of executing a collision energy spread method in which collision energy is changed into a plurality of levels and a mass spectrum obtained at each level of the collision energy is accumulated to obtain a cumulative mass spectrum, and the method for mass spectrometry including:

a CES-method-condition determination step for determining a plurality of collision-energy values to be used in the collision energy spread method, according to given conditions including the range of collision-energy values and the number of collision-energy values, in such a manner that n+1 collision-energy values to be used when the number is n+1 (where n is an integer equal to or greater than three) are determined so that the n+1 collision-energy values include n collision-energy values used when the number is n and one additional collision-energy value different from any one of the n collision-energy values; and an analysis execution step for sequentially setting the collision energy at the n+1 collision-energy values determined in the CES-method-condition determination step and controlling the measurement section so as to execute an MS/MS analysis under each collision-energy value and thereby obtain a mass spectrum for each collision-energy value.

One mode of the mass spectrometer according to the present invention developed for solving the previously described problem is a mass spectrometer capable of an MS/MS analysis and provided with a measurement section which includes a collision cell configured to dissociate an ion and a mass separator configured to perform a mass spectrometric analysis of product ions resulting from dissociation, the mass spectrometer including:

a CES-method-condition determiner configured to determine a plurality of collision-energy values to be used in the collision energy spread method, according to given conditions including the range of collision-energy values and the number of collision-energy values, in such a manner that n+1 collision-energy values to be used when the number is n+1 (where n is an integer equal to or greater than three) are determined so that the n+1 collision-energy values include n collision-energy values used when the number is n and one additional collision-energy value different from any one of the n collision-energy values;

an analysis controller configured to sequentially change the collision energy to the n+1 collision-energy values determined in the CES-method-condition determiner and control the measurement section so as to execute an MS/MS analysis under each collision-energy value; and a data processor configured to obtain a cumulative mass spectrum by accumulating mass spectra each of which is obtained under each of the different collision-energy values under the control of the analysis controller.

Advantageous Effects of Invention

In the previously described modes of the method for mass spectrometry and the mass spectrometer according to the present invention, even when the number of CE values specified within the CE-value range for performing the CES method is changed, the spectrum pattern of the cumulative mass spectrum undergoes only a small change since there is a considerable number of common CE values. Therefore, for example, the identification of compounds by pattern matching using a database of cumulative mass spectra (or similar methods) can be performed with a high level of accuracy. Additionally, the task of comparing cumulative mass spectra obtained for different samples will be easier.

DESCRIPTION OF EMBODIMENTS

A Q-TOF mass spectrometer as one embodiment of the mass spectrometer according to the present invention is hereinafter described with reference to the attached drawings.

Figure 1:
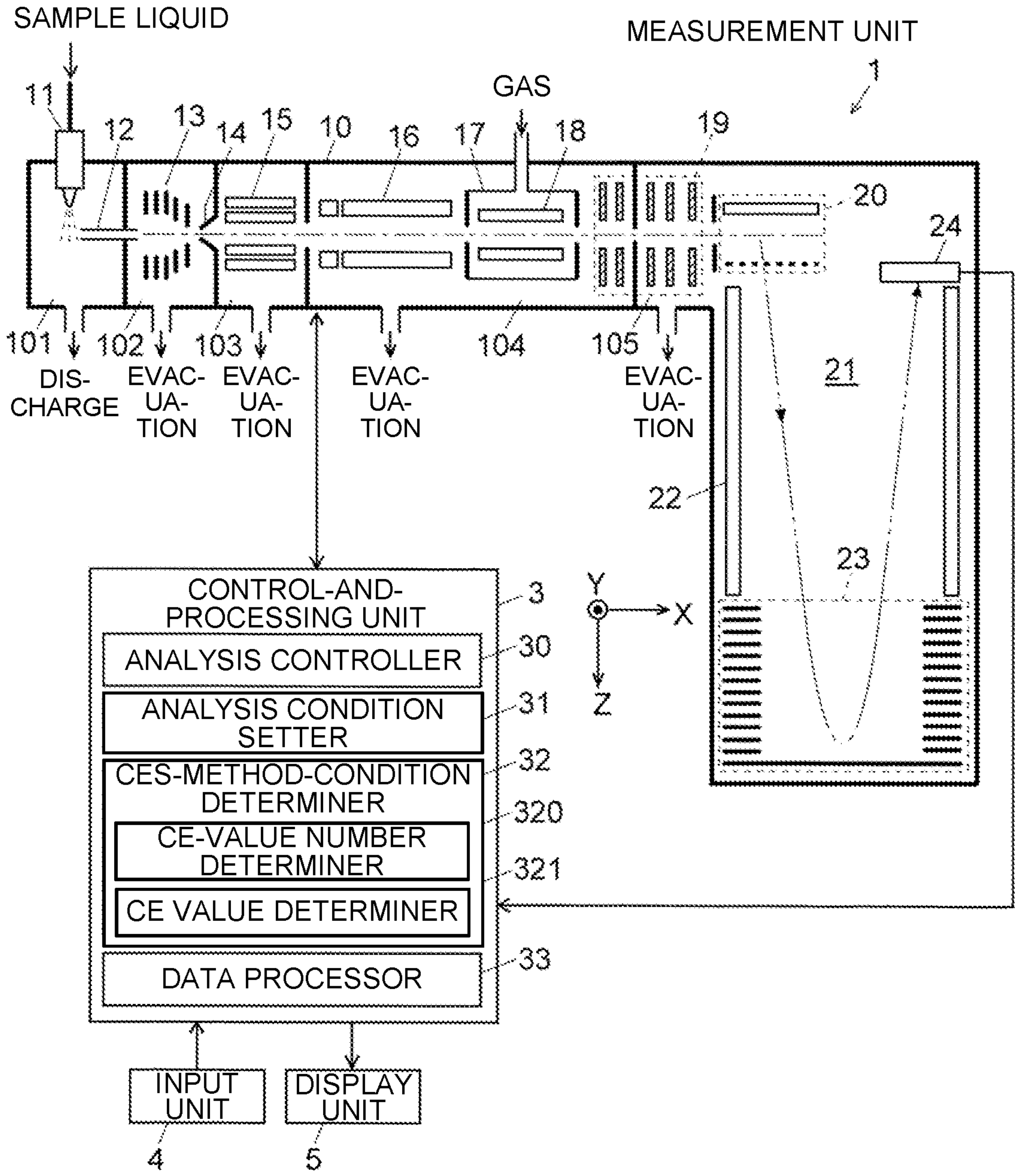
FIG. 1 is a configuration diagram of the main components of a Q-TOF mass spectrometer as one embodiment of the present invention.

FIG. 1 is a configuration diagram of the main components of the mass spectrometer according to the present embodiment.

As shown in FIG. 1, this mass spectrometer includes a measurement unit 1, control-and-processing unit 3, input unit 4 and display unit 5. The measurement unit 1 includes an ionization chamber 101 at substantially atmospheric pressure and a vacuum chamber 10 with the inner space divided into four sections. Specifically, a first intermediate vacuum chamber 102, second intermediate vacuum chamber 103, first high vacuum chamber 104 and second high vacuum chamber 105 are formed within the vacuum chamber 10, which are individually evacuated with vacuum pumps (turbomolecular pump and rotary pump, which are not shown) so that the degree of vacuum of the chambers progressively increases in the mentioned order. In other words, the measurement unit 1 has the configuration of a multi-stage differential pumping system.

The ionization chamber 101 is provided with an electrospray ionization (ESI) probe 11. The ESI probe 11 is supplied with an eluate, for example, from the exit end of a column in a liquid chromatograph (LC, which is not shown) located in the previous stage. The ionization chamber 101 communicates with the first intermediate vacuum chamber 102 through a thin desolvation tube 12. The first intermediate vacuum chamber 102 communicates with the second intermediate vacuum chamber 103 through an orifice formed at the apex of a skimmer 14. The first and second intermediate vacuum chambers 102 and 103 contain multipole ion guides 13 and 15, respectively.

The first high vacuum chamber 104 contains a quadrupole mass filter 16 and a collision cell 17 which contains a multipole ion guide 18. An array of ring electrodes arranged from the first high vacuum chamber 104 to the second high vacuum chamber 105 across the partition between these chambers forms an ion guide 19. The second high vacuum chamber 105 contains an orthogonal acceleration time-of-flight mass separator and an ion detector 24. The mass separator includes an orthogonal accelerator 20, a flight tube 22 forming a flight space inside, and a reflectron 23.

The control-and-processing unit 3 controls the measurement unit 1 to carry out an analysis as well as performs data processing based on the detection signals obtained with the ion detector 24. The control-and-processing unit 3 includes an analysis controller 30, analysis condition setter 31, CES-method-condition determiner 32 and data processor 33 as its functional blocks. The CES-method-condition determiner 32 includes a CE-value number determiner 320 and CE value determiner 321 as sub-functional blocks.

In normal cases, the control-and-processing unit 3 is actually a personal computer, on which the aforementioned functional blocks can be embodied by executing, on the computer, dedicated control-and-processing software (computer program) installed on the same computer. This type of computer program can be offered to users in the form of a non-transitory computer-readable record medium holding the program, such as a CD-ROM, DVD-ROM, memory card, or USB memory (dongle). The program may also be offered to users in the form of data transferred through the Internet or similar communication networks. The program can also be preinstalled on a computer provided as a part of a system before a user purchases the system.

An operation for a product-ion scan measurement, which is one form of the MS/MS analysis carried out in the mass spectrometer according to the present embodiment, is hereinafter schematically described.

The ESI probe 11 sprays an introduced liquid sample (e.g., an eluate from an LC column) into the ionization chamber 101 while imparting imbalanced electric charges to the liquid. The charged droplets generated by the spraying process come in contact with the surrounding high-temperature gas and are thereby atomized. The compound contained in each droplet is turned into a gas ion through the vaporization of the solvent from the droplet. The generated ions are sent through the desolvation tube 12 into the first intermediate vacuum chamber 102 and subsequently transported through the ion guide 13, the orifice of the skimmer 14 and the ion guide 15, to be introduced into the quadrupole mass filter 16 in the first high vacuum chamber 104.

A predetermined voltage composed of an RF (radio frequency) voltage superposed on a DC voltage is applied to each of the plurality of rod electrodes forming the quadrupole mass filter 16. An ion having a specific mass-to-charge ratio (m/z) corresponding to that voltage is selected as a precursor ion. After passing through the quadrupole mass filter 16, the precursor ion enters the collision cell 17, having a collision energy corresponding to the DC potential difference between the quadrupole mass filter 16 and the entrance electrode of the collision cell 17. Meanwhile, a collision gas, such as argon gas, is introduced into this collision cell 17. The precursor ion collides with this collision gas and is fragmented into various kinds of product ions through the CID process. The generated product ions exit the collision cell 17 and are transported through the ion guide 19 into the orthogonal accelerator 20.

The orthogonal accelerator 20 simultaneously ejects all of the introduced ions in a substantially orthogonal direction (Z-axis direction) to their direction of introduction (X-axis direction). Each ejected ion flies in the flight space 21 at a speed corresponding to its m/z value. After being repelled by the reflective electric field created by the reflectron 23 as indicated by the alternating long-dashed and double short-dashed lines in FIG. 1, the ions arrive at the ion detector 24. The various kinds of ions which simultaneously departed from the orthogonal accelerator 20 sequentially arrive at and are detected by the ion detector 24 in ascending order of m/z value. The ion detector 24 produces an ion intensity signal according to the amount of ions it has received. This signal is sent to the control-and-processing unit 3 as a detection signal.

The data processor 33 in the control-and-processing unit 3 digitizes the detection signal and creates a mass spectrum by converting, into an m/z value, the time of flight of each ion as measured from the point in time of the ejection of the ions from the orthogonal accelerator 20. The display unit 5 shows the thus created mass spectrum on its screen.

As already noted, the form of dissociation within the collision cell 17 changes with a change in the collision energy used in the MS/MS analysis, which leads to a change in the kinds and intensities of the mass peaks in the mass spectrum. The CES method is an analytical technique utilizing this fact, in which at least one mass spectrum is obtained under each of the plurality of different CE values, and the obtained mass spectra are accumulated to obtain a cumulative mass spectrum in which various kinds of ions originating from the target component are reflected.

Figure 2:
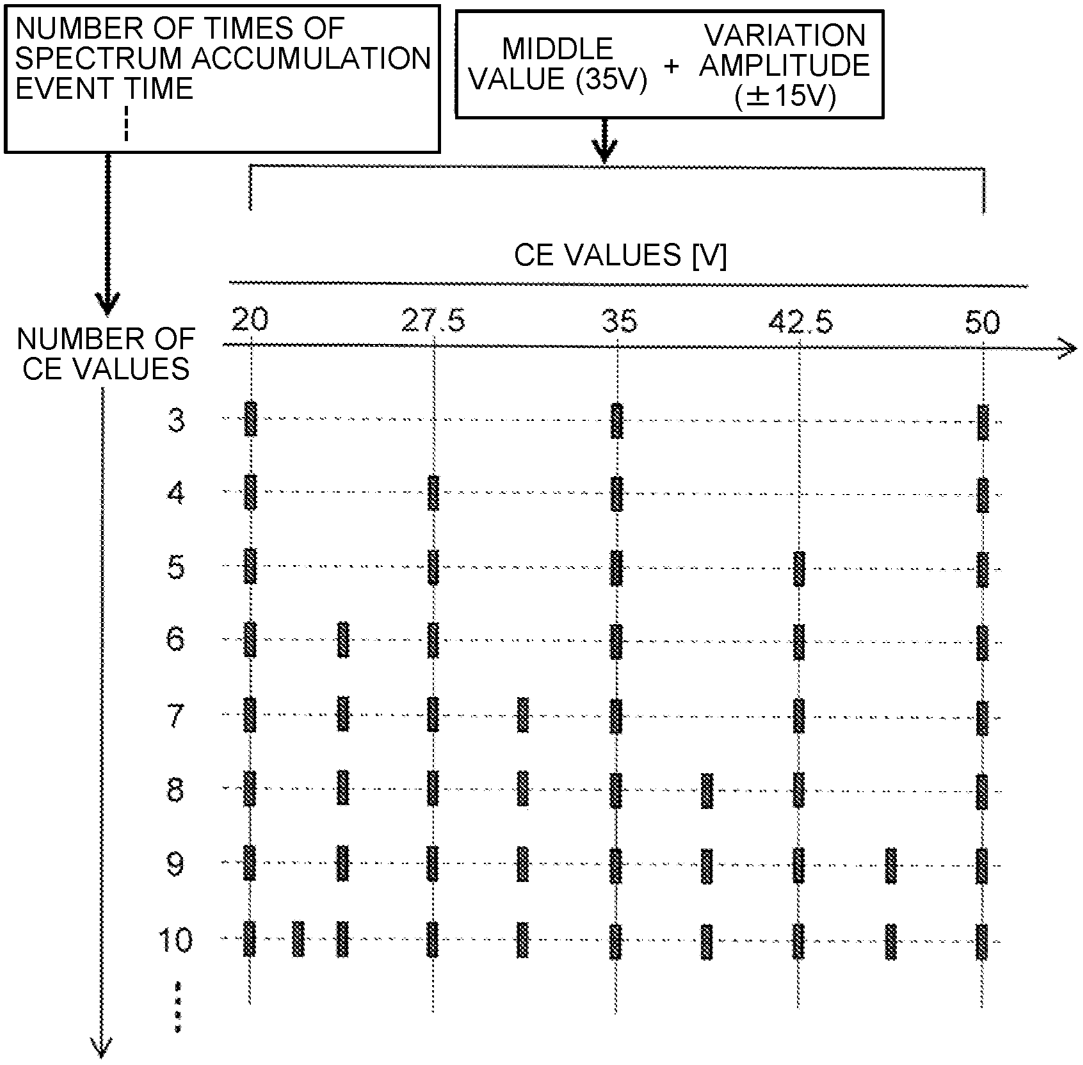
FIG. 2 is a chart showing one example of the relationship between the CE-value number and the CE values in the mass spectrometer according to the present embodiment.
Figure 3:
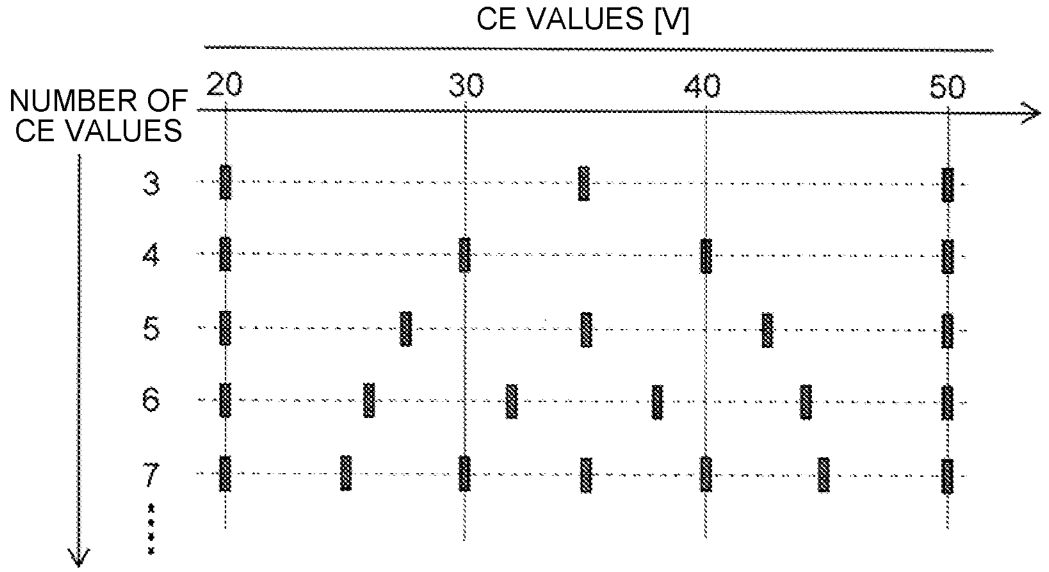
FIG. 3 is a chart showing one example of the relationship between the CE-value number and the CE values in a conventional mass spectrometer.

A characteristic control and processing for carrying out a CES method in the mass spectrometer according to the present embodiment is hereinafter described with reference to FIG. 2 in addition to FIG. 1. FIG. 2 is a chart showing one example of the relationship between the CE-value number and the CE values in the mass spectrometer according to the present embodiment. FIG. 3, which is shown for comparison with FIG. 2, is a chart showing one example of the relationship between the CE-value number and the CE values in a conventional mass spectrometer.

In advance of an analysis, a user (operator) inputs parameter values of the analysis conditions required for the CES method by operating the input unit 4. The analysis condition setter 31 receives the input of the parameter value of each analysis condition. The analysis conditions include the total number of times of the accumulation of mass spectra as well as the central value and width of variation of the CE value. The measurement time allotted to the measurement by the CES method and the number of times of the accumulation per one CE value may also be included in the analysis conditions. Needless to say, one or more of those parameter values may be given as fixed values which normal users are not allowed to change.

The CE-value number determiner 320 determines the number of levels of the CE value to be set in the CES method (which is the number of CE values that are different from each other; this number is hereinafter called the "CE-value number") based on the total number of times of the accumulation of mass spectra, measurement time, number of times of the accumulation per one CE value and other related conditions. For example, if the total number of times of the accumulation of mass spectra under the constraint of the measurement time is 10, and the number of times of the accumulation per one CE value is 2, then the CE-value number is 5. The CE-value number determiner 320 also determines the range over which the CE value is to be varied (this range is hereinafter called the "CE-value range") from the central value and width of variation of the CE value. As shown in FIG. 2, for example, when the central value of the CE value is 35 V and the width of variation is ±15 V, the CE-value range is from 20 to 50 V.

After the CE-value number and the CE-value range have been determined, the CE value determiner 321 determines a plurality of CE values as follows: Suppose that the CE-value is currently m. Initially, which of the following equations (1) and (2) the value of m satisfies is determined:

$$m=2^{p}+1 \quad (1)$$

$$2^{p}+1<m<2^{p+1}+1 \quad (2)$$

where p is a natural number whose value is determined from equation (1) or (2). If equation (1) holds, gain G is calculated by the following equation (3):

$$G=\text{width of CE-value range}/(m-1) \quad (3)$$

The m CE values are given by the following equation (4) using gain G:

$$[CE]=\text{lowest voltage value in the CE-value range}+G\times(q-1) \quad (4)$$

where q represents all natural numbers equal to or less than m.

On the other hand, when equation (2) holds, excess number H and two gains G1 and G2 are determined by the following equations (5)-(7):

$$H=m-(2^{p}+1) \quad (5)$$

$$G1=\text{width of CE-value range}/2^{p} \quad (6)$$

$$G2=\text{width of CE-value range}/2^{p+1} \quad (7)$$

The m CE values are given by the following equations (8) and (9) using excess number H and gain G1 and G2:

For the range of q≤H×2:

$$[CE]=\text{lowest voltage value in the CE-value range}+G2\times(q-1) \quad (8)$$

For the range of q>H×2:

$$[CE]=\text{lowest voltage value in the CE-value range}+G1\times(q-1-H) \quad (9)$$

As one example, consider the case where the CE-value range is from 20 to 50 V (the width of the CE-value range is 30 V) and m=5, as shown in FIG. 2.

In this case, since $m=5=2^2+1$, equation (1) holds, and G=30[V]/4=7.5 from equation (3). Consequently, the five CE values are 20, 27.5, 35. 42.5 and 50 from equation (4).

As another example, consider the case where the CE-value range is from 20 to 50 V and m=7, as shown in FIG. 2.

In this case, since $2^2+1<m=7<2^3+1$, equation (2) holds. From equations (5)-(7), $H=7-(2^2+1)=2$, G1=30[V]/4=7.5, and G2=30[V]/8=3.75. The CE values for the range of q≤2×2=4 are [CE]=20, 23.75, 27.5 and 31.25 from equation (8), while the CE values for the range of q>4 are [CE]=42.5 and 50 from equation (9). Combining the two results gives the seven CE values of 20, 23.75, 27.5, 31.25, 35, 42.5 and 50.

FIG. 2 shows the relationship between the CE-value number determined by the previously described procedure and the CE values. As is evident from FIG. 2, one of the features of the present method for determining CE values is that the CE values determined for a small CE-value number are always adopted in the case of a CE-value number larger than the former number. In the conventional example shown in FIG. 3, the CE values are determined by equally dividing the voltage range of the CE values. In this case, the CE values determined for a small CE-value number are not always adopted in the case of a CE-value number larger than the former number. For example, when the CE-value number is 6, the CE values common to those of the smaller CE-value number are only the upper and lower limits; none of the other CE values are common to the two cases. By comparison, in the example of the present embodiment shown in FIG. 2, the CE values determined under any CE-value number include all CE values determined for the CE-value number which is smaller than the former CE-value number by one.

The present method for determining CE values is also characterized by the way in which a new CE value is added when the CE-value number is to be increased by one: This new CE value is equal to the middle value of a pair of existing adjacent CE values, where a pair of smaller CE values is preferentially selected as the two values between which the middle value should be inserted. Technical meanings of these features will be described later.

After the CE values in the CES method have been determined in the previously described manner, the information is sent to the analysis controller 30. The analysis controller 30 operates the measurement unit 1 so that an MS/MS analysis is carried out under each of the specified CE values. Specifically, a voltage generator (not shown) in the measurement unit 1 is controlled so that the precursor ion has a specified amount of collision energy when it is introduced into the collision cell 17.

The data processor 33 receives detection signals obtained by MS/MS analyses under different CE values and accumulates mass spectra corresponding to those MS/MS analyses to obtain a cumulative mass spectrum. This cumulative mass spectrum shows mass peaks corresponding to the product ions generated by the CID process under the different CE values. The data processor 33 displays this cumulative mass spectrum on the display unit 5. It also calculates the degree of matching between the pattern of the cumulative mass spectrum obtained by the actual measurement and that of each of the cumulative mass spectra which, for example, are recorded in a database of cumulative mass spectra prepared beforehand. Based on this degree of matching, the data processor 33 identifies the compound.

In the mass spectrometer according to the present embodiment, the CE values are determined by the previously described characteristic procedure. This provides the following advantages, or technical meanings.

The spectrum pattern of a mass spectrum obtained by an MS/MS analysis depends on the CE value. Therefore, even when the CE-value number is different, a similar spectrum pattern of the cumulative mass spectrum will be obtained if the percentage of the common CE values is high. Therefore, for example, when the compound identification using a database of cumulative mass spectra is performed in the previously described manner, the determination on the identification based on the pattern matching can be performed with no significant problem even when the CE-value number used for the acquisition of the cumulative mass spectra recorded in the database is not identical to the CE-value number used for the acquisition of the cumulative mass spectrum by the actual measurement.

There is also the advantage that it is not always necessary to equalize the CE-value numbers when determining the identity, structural similarity or other aspects of a compound by comparing cumulative mass spectra separately obtained for a plurality of samples. This increases the flexibility in the setting of the analysis conditions.

On the other hand, the impact of the same amount of change in CE value (e.g., 1 V) on the form of the dissociation by the CID process changes depending on whether the CE value is relatively small or large. In general, a smaller CE value leads to a more noticeable change in the form of the dissociation of an ion for the same amount of change in CE value. Therefore, if the neighboring CE values are always set at regular intervals as shown in FIG. 3, it may be impossible to obtain satisfactory information of the product ions whose dissociation will be promoted within a range of small CE values.

By comparison, as is evident from FIG. 2, the procedure for determining CE values according to the present embodiment preferentially allots the CE values to a range of relatively small CE values, so that a range of small CE values is more likely to have narrower intervals of the neighboring CE values than a range of large CE values. Thus, as compared to the conventional method, it is more likely that the information of various product ions is exhaustively obtained with a high level of sensitivity, which is favorable for the identification and structural analysis of a compound using a cumulative mass spectrum.

In the previous description of the present embodiment, when CE values are determined in the CE value determiner 321, mathematical calculations and conditional judgments using computational expressions are performed to derive CE values from the set conditions. It is also possible to prepare and save a lookup table based on the numerical values obtained by those calculations. In that case, the lookup table can be configured to have the set conditions (e.g., the CE-value number and the CE-value range) as the input and the resulting CE values as the output. Needless to say, the previously described procedure is a mere example of determining CE values by mathematical calculations and conditional judgments using computational expressions; any procedure which can yield similar results may be used.

Although the mass spectrometer according to the previous embodiment is a Q-TOF mass spectrometer, it is evident that the present invention can be applied to other types of tandem mass spectrometers capable of an MS/MS analysis, such as a triple quadrupole mass spectrometer.

The previously described embodiment and its modifications are also mere examples of the present invention, and any change, modification or addition appropriately made within the gist of the present invention will evidently fall within the scope of claims of the present application.

[Various Modes]

It is evident for a person skilled in the art that the previously described illustrative embodiment is a specific example of the following modes of the present invention.

(Clause 1) One mode of the method for mass spectrometry according to the present invention is a method for mass spectrometry using a mass spectrometer capable of an MS/MS analysis and provided with a measurement section which includes a collision cell configured to dissociate an ion and a mass separator configured to perform a mass spectrometric analysis of product ions resulting from dissociation, the method for mass spectrometry including the step of executing a collision energy spread method in which collision energy is changed into a plurality of levels and a mass spectrum obtained at each level of the collision energy is accumulated to obtain a cumulative mass spectrum, and the method for mass spectrometry including:

a CES-method-condition determination step for determining a plurality of collision-energy values to be used in the collision energy spread method, according to given conditions including the range of collision-energy values and the number of collision-energy values, in such a manner that n+1 collision-energy values to be used when the number is n+1 (where n is an integer equal to or greater than three) are determined so that the n+1 collision-energy values include n collision-energy values used when the number is n and one additional collision-energy value different from any one of the n collision-energy values; and an analysis execution step for sequentially setting the collision energy at the n+1 collision-energy values determined in the CES-method-condition determination step and controlling the measurement section so as to execute an MS/MS analysis under each collision-energy value and thereby obtain a mass spectrum for each collision-energy value.

(Clause 5) One mode of the mass spectrometer according to the present invention is a mass spectrometer capable of an MS/MS analysis and provided with a measurement section which includes a collision cell configured to dissociate an ion and a mass separator configured to perform a mass spectrometric analysis of product ions resulting from dissociation, the mass spectrometer including:

- a CES-method-condition determiner configured to determine a plurality of collision-energy values to be used in a collision energy spread method, according to given conditions including the range of collision-energy values and the number of collision-energy values, in such a manner that n+1 collision-energy values to be used when the number is n+1 (where n is an integer equal to or greater than three) are determined so that the n+1 collision-energy values include n collision-energy values used when the number is n and one additional collision-energy value different from any one of the n collision-energy values;
- an analysis controller configured to sequentially change the collision energy to the n+1 collision-energy values determined in the CES-method-condition determiner and control the measurement section so as to execute an MS/MS analysis under each collision-energy value; and
- a data processor configured to obtain a cumulative mass spectrum by accumulating mass spectra each of which is obtained under each of the different collision-energy values under the control of the analysis controller.

In the method for mass spectrometry according to Clause 1 and the mass spectrometer according to Clause 5, even when the number of CE values for performing the CES method is changed, the spectrum pattern of the cumulative mass spectrum undergoes only a small change since there is a considerable number of common CE values. Therefore, for example, the identification of compounds by pattern matching using a database of cumulative mass spectra (or similar methods) can be performed with a high level of accuracy. Additionally, the task of comparing cumulative mass spectra obtained for different samples will be easier.

(Clause 2) In the method for mass spectrometry according to Clause 1, the CES-method-condition determination step may include determining the one additional collision-energy value different from any one of the n collision-energy values in such a manner that two collision-energy values neighboring each other with a large interval of value in the sequence of the collision-energy values are preferentially selected as two collision-energy values between which a new collision-energy value is to be added.

(Clause 6) In the mass spectrometer according to Clause 5, the CES-method-condition determiner may determine the one additional collision-energy value different from any one of the n collision-energy values in such a manner that two collision-energy values neighboring each other with a large interval of value in the sequence of the collision-energy values are preferentially selected as two collision-energy values between which a new collision-energy value is to be added.

In the method for mass spectrometry according to Clause 2 and the mass spectrometer according to Clause 6, when a few or more collision-energy values are to be determined within a predetermined range of collision-energy values, the situation in which the interval between two neighboring collision-energy values becomes extremely wide can be avoided. This enables the acquisition of a cumulative mass spectrum in which the information of product ions generated by dissociation is satisfactorily reflected even when the dissociation of those product ions is particularly promoted at around a specific collision-energy value.

(Clause 3) In the method for mass spectrometry according to Clause 2, the CES-method-condition determination step may include adding a middle value of the two collision-energy values when adding a new collision-energy value between the two collision-energy values.

(Clause 7) In the mass spectrometer according to Clause 6, the CES-method-condition determiner may add a middle value of the two collision-energy values when adding a new collision-energy value between the two collision-energy values.

In the method for mass spectrometry according to Clause 3 and the mass spectrometer according to Clause 7, when a few or more collision-energy values are to be determined within a predetermined range of collision-energy values, the situation in which the collision-energy values are distributed in an extremely biased form within the aforementioned range can be avoided. This enables the acquisition of a cumulative mass spectrum in which the information of various product ions originating from a target compound is reflected with a satisfactory level of uniformity.

(Clause 4) In the method for mass spectrometry according to Clause 2 or 3, the CES-method-condition determination step may include adding the new collision-energy value in such a manner that, when there are a plurality of pairs of collision-energy values whose intervals are equal, a pair of relatively small energy values is preferentially selected as the two collision-energy values between which the new collision-energy value is to be added.

(Clause 8) In the mass spectrometer according to Clause 5 or 6, the CES-method-condition determiner may add the new collision-energy value in such a manner that, when there are a plurality of pairs of collision-energy values whose intervals are equal, a pair of relatively small energy values is preferentially selected as the two collision-energy values between which the new collision-energy value is to be added.

In the method for mass spectrometry according to Clause 4 and the mass spectrometer according to Clause 8, since the collision-energy values are preferentially allotted to a range of relatively small collision-energy values, the intervals of the neighboring collision-energy values within a range of small collision-energy values are likely to be narrower than those within a range of large collision-energy values. In general, the change in the form of the dissociation with a change in collision energy becomes more sensitive when the change in collision energy occurs within a range of smaller collision-energy values. Therefore, in the method for mass spectrometry according to Clause 4 and the mass spectrometer according to Clause 8, it is more likely that the information of various product ions is exhaustively obtained with a high level of sensitivity, which is favorable for the identification and structural analysis of a compound using a cumulative mass spectrum.

REFERENCE SIGNS LIST

1 . . . Measurement Unit
10 . . . Vacuum Chamber
101 . . . Ionization Chamber
102 . . . First Intermediate Vacuum Chamber
103 . . . Second Intermediate Vacuum Chamber
104 . . . First High Vacuum Chamber
105 . . . Second High Vacuum Chamber
11 . . . ESI Probe
12 . . . Desolvation Tube
13, 15, 18, 19 . . . Ion Guide
14 . . . Skimmer
16 . . . Quadrupole Mass Filter
17 . . . Collision Cell
20 . . . Orthogonal Accelerator
21 . . . Flight Space
22 . . . Flight Tube
23 . . . Reflectron
24 . . . Ion Detector
3 . . . Control-and-Processing Unit
30 . . . Analysis Controller
31 . . . Analysis Condition Setter
32 . . . CES Method Condition Determiner
320 . . . CE-Value Number Determiner
321 . . . CE Value Determiner
33 . . . Data Processor
4 . . . Input Unit
5 . . . Display Unit

The invention claimed is:

1. A method for mass spectrometry performed by a mass spectrometer capable of an MS/MS analysis, the method comprising:

determining n collision-energy values to be used in the MS/MS analysis according to given conditions including a range of collision-energy values and a number of collision-energy values, where n is an integer equal to or greater than three, sequentially setting the collision energy at the n collision-energy values determined;

dissociating an ion at each of the n collision energy values;

acquiring and accumulating a mass spectrum obtained at each of the n collision energy values;

generating a cumulative mass spectrum based on the mass obtained at each of the collision energy values, and comparing the cumulative mass spectrum with a reference cumulative mass spectrum prepared in advance, the reference cumulative mass spectrum being obtained by accumulating a mass spectrum obtained at each of m collision energy values where m is an integer, wherein the m collision energy values include the n collision energy values when m is larger than n, and the n collision energy values include the m collision energy values when n is larger than m.

2. The method for mass spectrometry according to claim 1, wherein n is larger than m, and one collision-energy value among the n collision-energy values is positioned between two neighboring collision-energy values having the largest interval among the m collision-energy values.

3. The method for mass spectrometry according to claim 2, wherein a middle value of the two neighboring collision-energy values is determined as the one collision-energy value.

4. The method for mass spectrometry according to claim 2, wherein in a case that there are a plurality of pairs of neighboring collision-energy values whose intervals are equal, a pair having lower collision-energy values compared to other pairs is selected as the two neighboring collision-energy values between which the one collision-energy value is to be positioned.

5. A mass spectrometer capable of an MS/MS analysis, the mass spectrometer comprising:

a collision cell configured to dissociate an ion;

a mass separator configured to perform a mass spectrometric analysis of product ions resulting from dissociation, at least one memory configured to store at least one program; and at least one processor configured to operate as instructed by the at least one program, the at least one program being configured to cause the at least one processor to:

determine n collision-energy values to be used in the MS/MS analysis according to given conditions including a range of collision-energy values and a number of collision-energy values, where n is an integer equal to or greater than three, sequentially setting the collision energy at the n collision-energy values determined and execute the MS/MS analysis under each collision-energy value; and obtain a cumulative mass spectrum by accumulating mass spectra each of which is obtained under each of the n collision-energy values, and comparing the cumulative mass spectrum with a reference cumulative mass spectrum prepared in advance, the reference cumulative mass spectrum being obtained by accumulating a mass spectrum obtained at each of m collision energy values where m is an integer, wherein the m collision energy values include the n collision energy values when m is larger than n, and the n collision energy values include the m collision energy values when n is larger than m.

6. The mass spectrometer according to claim 5, wherein n is larger than m, and the at least one program is further configured to cause the at least one processor to:

determine one collision-energy value among the n collision-energy values positioned between two neighboring collision-energy values having the largest interval among the m collision-energy values.

7. The mass spectrometer according to claim 6, wherein the at least one program is further configured to cause the at least one processor to:

determine a middle value of the two neighboring collision-energy values as the one collision-energy value.

8. The mass spectrometer according to claim 6, wherein the at least one program is further configured to cause the at least one processor to:

in a case that there are a plurality of pairs of neighboring collision-energy values whose intervals are equal, select a pair having lower collision-energy values compared to other pairs as the two neighboring collision-energy values between which the one collision-energy value is to be determined.

* * * * *